(12) United States Patent
Le et al.

(10) Patent No.: US 10,762,917 B1
(45) Date of Patent: Sep. 1, 2020

(54) REVERSED MODE SPIN TORQUE OSCILLATOR WITH SHAPED FIELD GENERATION LAYER

(71) Applicant: Western Digital Technologies, Inc., San Jose, CA (US)

(72) Inventors: Quang Le, San Jose, CA (US); Yongchul Ahn, San Jose, CA (US); Susumu Okamura, Fujisawa (JP); Zheng Gao, San Jose, CA (US); Alexander Goncharov, Morgan Hill, CA (US); Muhammad Asif Bashir, San Jose, CA (US); Petrus Antonius Van Der Heijden, Cupertino, CA (US); James Mac Freitag, Sunnyvale, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/368,550

(22) Filed: Mar. 28, 2019

Related U.S. Application Data

(60) Provisional application No. 62/674,581, filed on May 21, 2018.

(51) Int. Cl.
*G11B 5/31* (2006.01)
*G11B 5/127* (2006.01)
(Continued)

(52) U.S. Cl.
CPC ............ *G11B 5/3133* (2013.01); *G11B 5/115* (2013.01); *G11B 5/1278* (2013.01); *G11B 5/3116* (2013.01); *G11B 2005/0024* (2013.01)

(58) Field of Classification Search
CPC ...... G11B 5/3133; G11B 5/115; G11B 5/1278; G11B 5/3116; G11B 2005/0024
(Continued)

(56) References Cited

U.S. PATENT DOCUMENTS

| 8,520,338 B2 | 8/2013 | Udo et al. |
| 8,724,260 B2 | 5/2014 | Igarashi et al. |

(Continued)

FOREIGN PATENT DOCUMENTS

| WO | WO-2010053187 A1 * | 5/2010 | ............ H01L 43/08 |

OTHER PUBLICATIONS

Sato, Yo et al.; "Thin Spin-torque Oscillator with High AC-Field for High Density Microwave-Assisted Magnetic Recording"; IEEE Transactions on Magnetics, vol. 49, No. 7; Jul. 2013 (4 pages).

*Primary Examiner* — Allen T Cao
(74) *Attorney, Agent, or Firm* — Patterson & Sheridan, LLP; Steven Versteeg

(57) ABSTRACT

The present disclosure generally relates to data storage devices, and more specifically, to a magnetic media drive employing a magnetic recording head. The head includes a trailing shield, a main pole, an STO disposed between the trailing shield and the main pole, and a non-magnetic conductive structure adjacent to the main pole and in contact with the STO. The STO includes an FGL and an SPL, and the FGL is disposed between the main pole and the SPL. The FGL includes a side extending over the main pole and at least a portion of the non-magnetic conductive structure. With the FGL disposed proximate to the main pole and over at least a portion of the non-magnetic conductive structure, current crowding and disturbance from the trailing shield are minimized.

12 Claims, 7 Drawing Sheets

(51) Int. Cl.
*G11B 5/115* (2006.01)
*G11B 5/00* (2006.01)

(58) Field of Classification Search
USPC .......................................... 360/125.1–125.5
See application file for complete search history.

(56) References Cited

U.S. PATENT DOCUMENTS

| | | | |
|---|---|---|---|
| 8,824,103 B2 | 9/2014 | Shiimoto et al. | |
| 9,007,723 B1 | 4/2015 | Igarashi et al. | |
| 9,064,508 B1 * | 6/2015 | Shiimoto | G11B 5/187 |
| 9,202,484 B1 | 12/2015 | Watanabe et al. | |
| 9,230,569 B1 | 1/2016 | Shimoto et al. | |
| 9,355,655 B1 * | 5/2016 | Udo | G11B 5/1278 |
| 9,406,315 B2 | 8/2016 | Shiimoto et al. | |
| 2014/0133048 A1 * | 5/2014 | Shiimoto | G11B 5/1278 |
| | | | 360/75 |
| 2014/0177100 A1 * | 6/2014 | Sugiyama | G11B 5/1278 |
| | | | 360/125.03 |
| 2015/0124347 A1 * | 5/2015 | Shimoto | G11B 5/314 |
| | | | 360/71 |
| 2015/0228295 A1 * | 8/2015 | Shiimoto | G11B 5/1278 |
| | | | 360/125.31 |
| 2015/0333254 A1 * | 11/2015 | Liu | H01L 43/08 |
| | | | 438/3 |
| 2016/0247550 A1 * | 8/2016 | Fukami | H01L 43/02 |

* cited by examiner

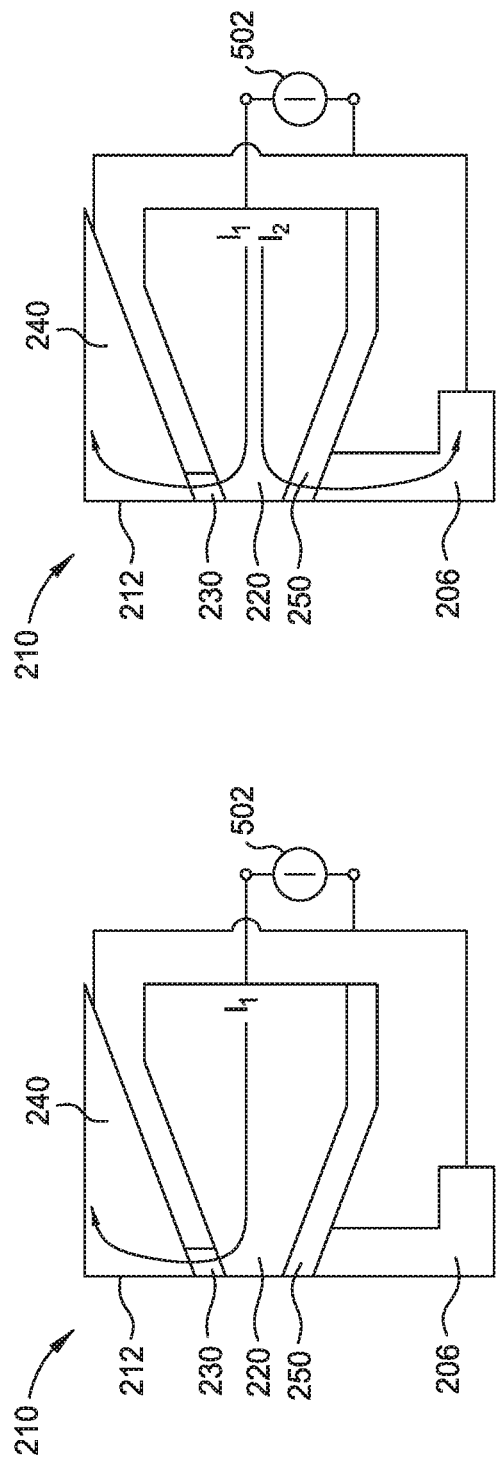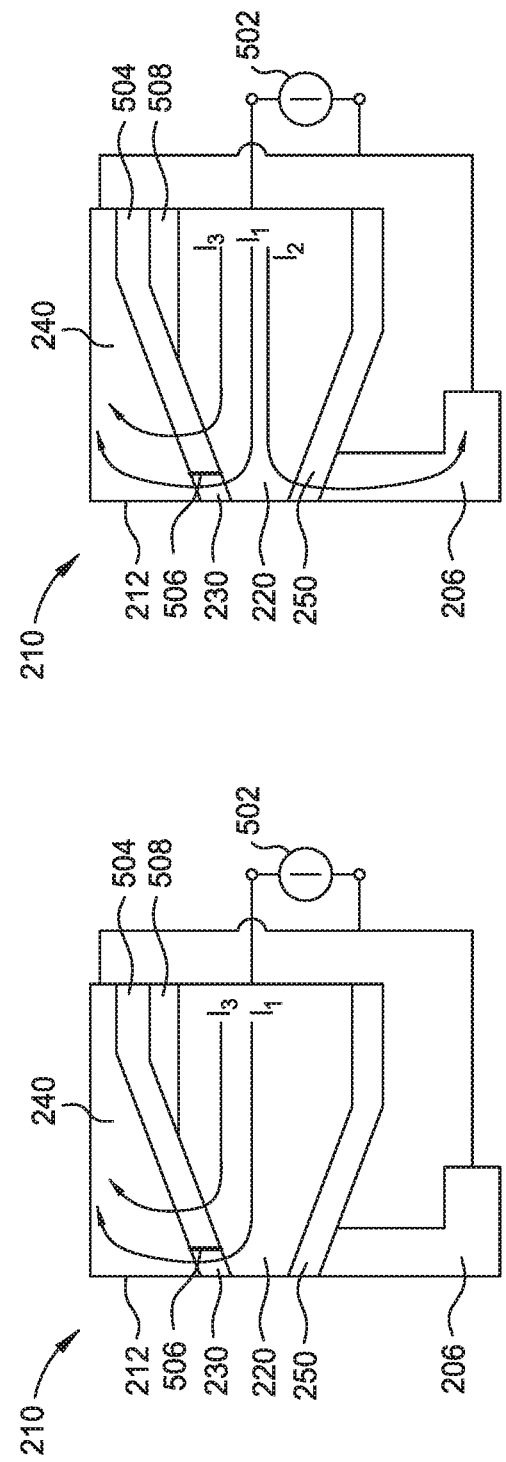

REVERSED MODE SPIN TORQUE OSCILLATOR WITH SHAPED FIELD GENERATION LAYER

CROSS-REFERENCE TO RELATED APPLICATIONS

This application claims benefit of U.S. Provisional Patent Application Ser. No. 62/674,581, filed May 21, 2018, which is herein incorporated by reference.

BACKGROUND OF THE DISCLOSURE

Field of the Disclosure

Embodiments of the present disclosure generally relate to data storage devices, and more specifically, to a magnetic media drive employing a magnetic recording head.

Description of the Related Art

Over the past few years, microwave assisted magnetic recording (MAMR) has been studied as a recording method to improve the areal density of a magnetic read/write device, such as a hard disk drive (HDD). MAMR enabled magnetic recording heads utilize a MAMR stack disposed between the trailing shield and the main pole to improve write field and/or field gradient, leading to better areal density capability (ADC). The MAMR stack may be a spin torque oscillator (STO) for generating a microwave (high frequency AC magnetic field). When a bias current is conducted to the STO from the trailing shield, the STO oscillates and provides an AC magnetic field to the recording medium. The AC magnetic field may reduce the coercive force of the recording medium, thus high quality recording by MAMR may be achieved. Typically the STO includes a spin polarization layer (SPL) for transmitting the spin polarized torque, a field generation layer (FGL) for generating the AC magnetic field, and an interlayer disposed between the SPL and the FGL. The FGL is located proximate to the trailing shield, and the SPL is located proximate to the main pole.

However, the trailing shield, or a trailing shield hot seed layer, can have a negative magnetic effect on the FGL due to the proximity to the FGL. Furthermore, since the SPL is aligned to the main pole, current efficiency from the trailing shield to the STO is low due to current crowding.

Therefore, there is a need in the art for an improved MAMR enabled magnetic head.

SUMMARY OF THE DISCLOSURE

The present disclosure generally relates to data storage devices, and more specifically, to a magnetic media drive employing a magnetic recording head. The head includes a trailing shield, a main pole, an STO disposed between the trailing shield and the main pole, and a non-magnetic conductive structure adjacent to the main pole and in contact with the STO. The STO includes an FGL and an SPL, and the FGL is disposed between the main pole and the SPL. The FGL includes a side extending over the main pole and at least a portion of the non-magnetic conductive structure. With the FGL disposed proximate to the main pole and over at least a portion of the non-magnetic conductive structure, current crowding and disturbance from the trailing shield are minimized.

In one embodiment, a magnetic recording head includes a main pole, and a spin torque oscillator in contact with the main pole. The spin torque oscillator includes a spin polarization layer and a field generation layer disposed between the spin polarization layer and the main pole. The field generation layer includes a surface at a media facing surface, and the surface has a trapezoidal shape. The magnetic recording head further includes a non-magnetic conductive structure surrounding at least a portion of the main pole, and the non-magnetic conductive structure is in contact with the spin torque oscillator.

In another embodiment, a magnetic recording head includes a main pole, and a spin torque oscillator in contact with the main pole. The spin torque oscillator includes a spin polarization layer and a field generation layer disposed between the spin polarization layer and the main pole. The field generation layer includes a surface at a media facing surface, and the surface includes a first side facing the main pole and a second side facing the spin polarization layer. The first side has a length that is substantially greater than a length of the second side. The magnetic recording head further includes a non-magnetic conductive structure surrounding at least a portion of the main pole, and the first side of the field generation layer is disposed over at least a portion of the non-magnetic conductive structure.

In another embodiment, a magnetic recording head includes a main pole, and a spin torque oscillator in contact with the main pole. The spin torque oscillator includes a spin polarization layer and a field generation layer disposed between the spin polarization layer and the main pole. The field generation layer includes a surface at a media facing surface, and the surface includes a first side facing the main pole, a second side facing the spin polarization layer, a third side connecting the first side and the second side, and a fourth side opposite the third side. The first side forms a first acute angle with the third side. The magnetic recording head further includes a non-magnetic conductive structure surrounding at least a portion of the main pole, and the non-magnetic conductive structure is in contact with the spin torque oscillator.

In another embodiment, a magnetic recording head includes a leading shield, a trailing shield, a main pole having a surface at a media facing surface, wherein the surface includes a side, a spin torque oscillator in contact with the side of the main pole, wherein the spin torque oscillator includes a spin polarization layer and a field generation layer. The magnetic recording head further includes a non-magnetic conductive structure surrounding at least a portion of the main pole, a first current source connected to the main pole and the trailing shield, and a second current source connected to the main pole and the leading shield.

In another embodiment, a magnetic recording head includes a leading shield, a trailing shield, a main pole having a surface at a media facing surface, wherein the surface includes a side, a non-magnetic conductive layer disposed between the trailing shield and the main pole, a spin torque oscillator in contact with the side of the main pole, wherein the spin torque oscillator comprises a spin polarization layer and a field generation layer. The magnetic recording head further includes a non-magnetic conductive structure surrounding at least a portion of the main pole, and a current source configured to flow a first current from the main pole to the trailing shield through the spin torque oscillator and a second current from the main pole to the trailing shield through the non-magnetic conductive layer.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 5A-5D are cross-sectional side views of the write head of FIG. 2 according to one embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, and more specifically, to a magnetic media drive employing a magnetic recording head. The head includes a trailing shield, a main pole, an STO disposed between the trailing shield and the main pole, and a non-magnetic conductive structure adjacent to the main pole and in contact with the STO. The STO includes an FGL and an SPL, and the FGL is disposed between the main pole and the SPL. The FGL includes a side extending over the main pole and at least a portion of the non-magnetic conductive structure. With the FGL disposed proximate to the main pole and over at least a portion of the non-magnetic conductive structure, current crowding and disturbance from the trailing shield are minimized.

The terms "over," "under," "between," and "on" as used herein refer to a relative position of one layer with respect to other layers. As such, for example, one layer disposed over or under another layer may be directly in contact with the other layer or may have one or more intervening layers. Moreover, one layer disposed between layers may be directly in contact with the two layers or may have one or more intervening layers. In contrast, a first layer "on" a second layer is in contact with the second layer. Additionally, the relative position of one layer with respect to other layers is provided assuming operations are performed relative to a substrate without consideration of the absolute orientation of the substrate.

Figure 1:
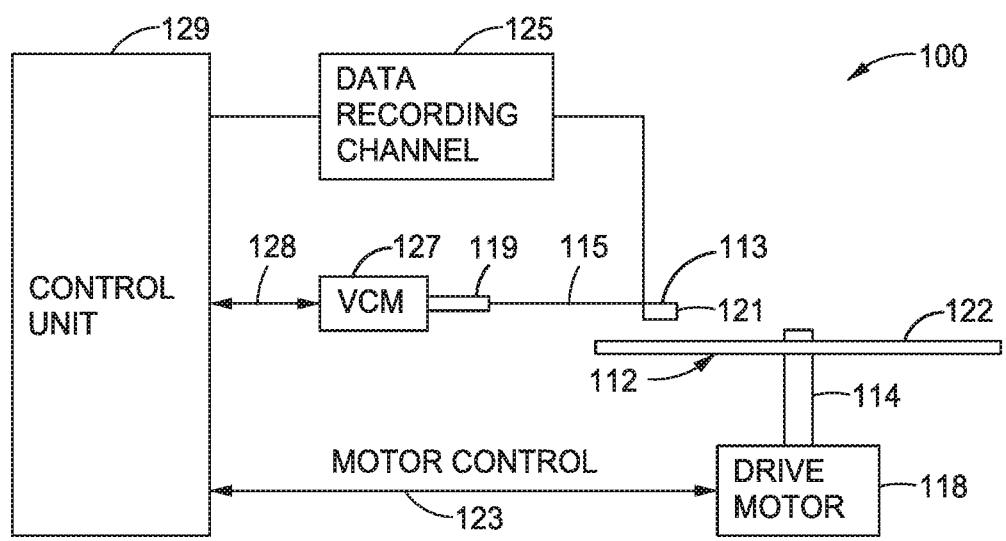
FIG. 1 is a schematic illustration of a magnetic media device according to one embodiment.

FIG. 1 is a schematic illustration of a data storage device such as a magnetic media device. Such a data storage device may be a single drive/device or comprise multiple drives/devices. For the sake of illustration, a single disk drive 100 is shown according to one embodiment. As shown, at least one rotatable magnetic disk 112 is supported on a spindle 114 and rotated by a drive motor 118. The magnetic recording on each magnetic disk 112 is in the form of any suitable patterns of data tracks, such as annular patterns of concentric data tracks (not shown) on the magnetic disk 112.

At least one slider 113 is positioned near the magnetic disk 112, each slider 113 supporting one or more magnetic head assemblies 121 that may include an STO for applying an AC magnetic field to a disk surface 122 and one or more non-magnetic conductive layers in contact with the STO. As the magnetic disk 112 rotates, the slider 113 moves radially in and out over the disk surface 122 so that the magnetic head assembly 121 may access different tracks of the magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator means 127. The actuator means 127 as shown in FIG. 1 may be a voice coil motor (VCM). The VCM includes a coil movable within a fixed magnetic field, the direction and speed of the coil movements being controlled by the motor current signals supplied by control unit 129.

During operation of the disk drive 100, the rotation of the magnetic disk 112 generates an air bearing between the slider 113 and the disk surface 122 which exerts an upward force or lift on the slider 113. The air bearing thus counterbalances the slight spring force of suspension 115 and supports slider 113 off and slightly above the disk surface 122 by a small, substantially constant spacing during normal operation.

The various components of the disk drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads on the assembly 121 by way of recording channel 125.

The above description of a typical magnetic media device and the accompanying illustration of FIG. 1 are for representation purposes only. It should be apparent that magnetic media devices may contain a large number of media, or disks, and actuators, and each actuator may support a number of sliders.

Figure 2:
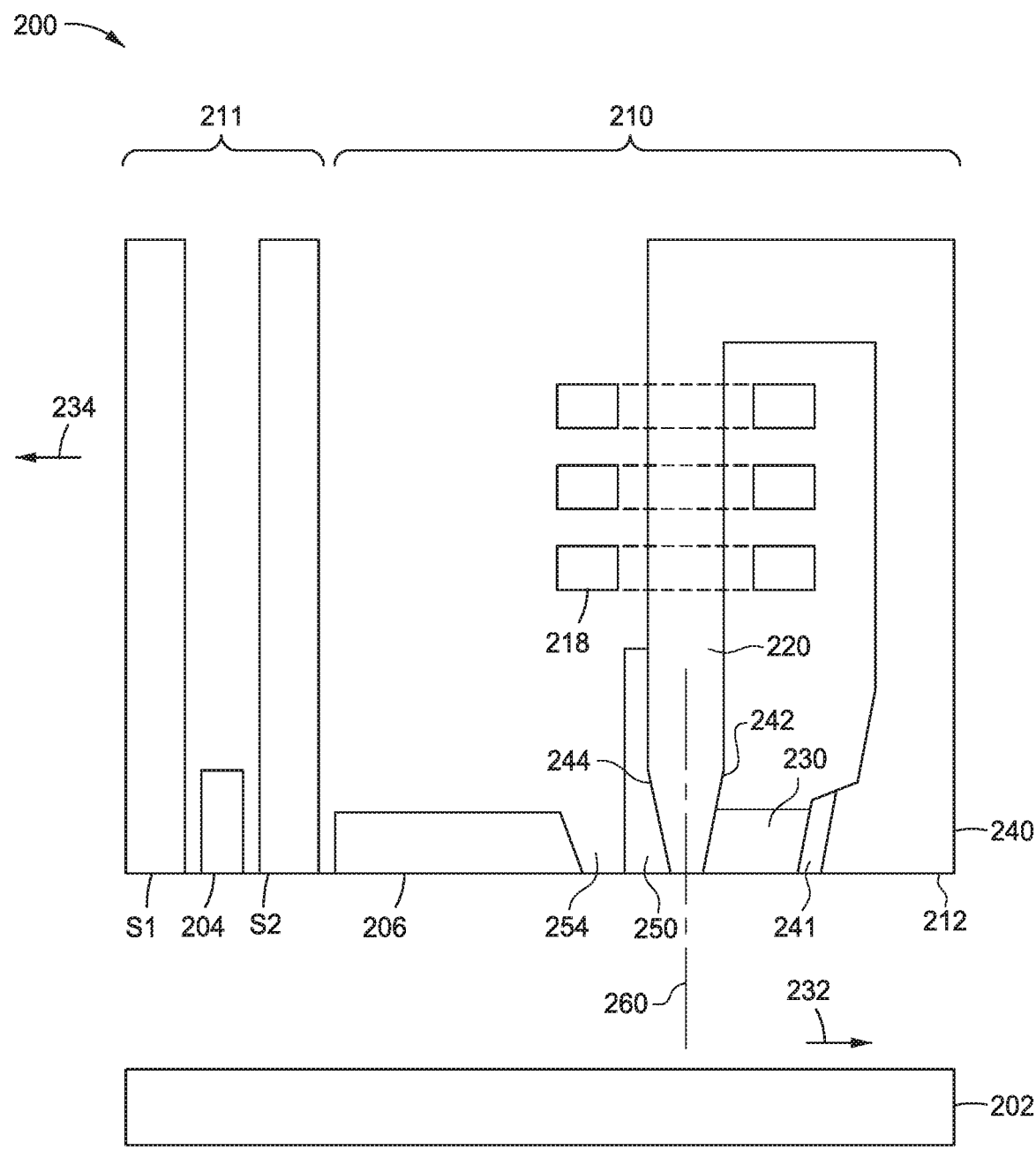
FIG. 2 is a fragmented, cross-sectional side view of a MAMR read/write head facing a magnetic disk according to one embodiment.

FIG. 2 is a fragmented, cross-sectional side view of a MAMR read/write head 200 facing a magnetic disk 202 according to one embodiment. The MAMR read/write head 200 and the magnetic disk 202 may correspond to the magnetic head assembly 121 and the magnetic disk 112, respectively in FIG. 1. The read/write head 200 includes a media facing surface (MFS) 212, such as an air bearing surface (ABS), facing the disk 202, a magnetic write head 210, and a magnetic read head 211. As shown in FIG. 2, the magnetic disk 202 moves past the write head 210 in the direction indicated by the arrow 232 and the read/write head 200 moves in the direction indicated by the arrow 234.

In some embodiments, the magnetic read head 211 is a magnetoresistive (MR) read head that includes an MR sensing element 204 located between MR shields S1 and S2. In other embodiments, the magnetic read head 211 is a magnetic tunnel junction (MTJ) read head that includes a MTJ sensing device 204 located between MR shields S1 and S2. The magnetic fields of the adjacent magnetized regions in the magnetic disk 112 are detectable by the MR (or MTJ) sensing element 204 as the recorded bits.

The write head 210 includes a main pole 220, a leading shield 206, a trailing shield 240, an STO 230 disposed between the main pole 220 and the trailing shield 240, and a coil 218 that excites the main pole 220. The coil 218 may have a "pancake" structure which winds around a back-contact between the main pole 220 and the trailing shield 240, instead of a "helical" structure shown in FIG. 2. A dielectric material 254, such as alumina, is located between the leading shield 206 and the main pole 220. The main pole 220 may be a magnetic material such as a FeCo alloy. The leading shield 206 and the trailing shield 240 may be a magnetic material, such as NiFe alloy.

The main pole 220, the trailing shield 240 and the STO 230 all extend to the MFS 212. The STO 230 is electrically coupled to the main pole 220 and the trailing shield 240. In some embodiment, a trailing shield hot seed layer 241 is coupled to the trailing shield 240, and the STO 230 is electrically coupled to the trailing shield hot seed layer 241. The trailing shield hot seed layer 241 may include a high moment sputter material, such as CoFeN or FeXN, where X includes at least one of Rh, Al, Ta, Zr, and Ti. The main pole 220 includes a trailing taper 242 and a leading taper 244. The trailing taper 242 extends from a location recessed from the MFS 212 to the MFS 212. The leading taper 244 extends from a location recessed from the MFS 212 to the MFS 212. The trailing taper 242 and the leading taper 244 may have the same degree of taper, and the degree of taper is measured with respect to a longitudinal axis 260 of the main pole 220. In some embodiments, the main pole 220 does not include the trailing taper 242 and the leading taper 244. Instead, the main pole 220 includes a trailing side (not shown) and a leading side (not shown), and the trailing side and the leading side are substantially parallel.

A non-magnetic conductive structure 250 is coupled to the main pole 220. The non-magnetic conductive structure 250 extends from the MFS 212 to a location recessed from the MFS 212. The non-magnetic conductive structure 250 and the STO 230 are described in detail in FIG. 3.

During operation, the STO 230 generates an AC magnetic field that travels to the magnetic disk 202 to lower the coercivity of the region of the magnetic disk 202 adjacent to the STO 230.

Figure 3:
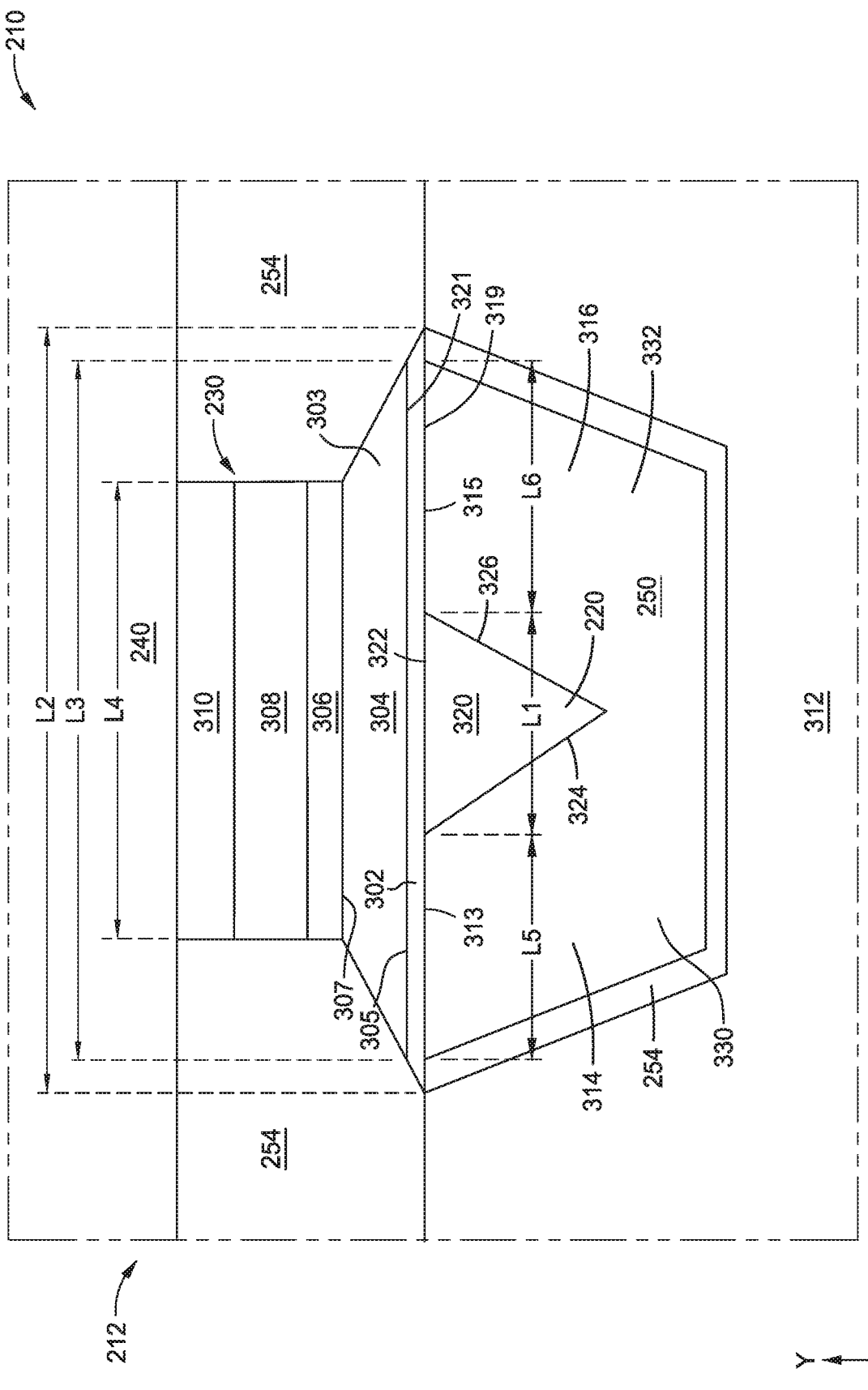
FIG. 3 is a MFS view of a portion of a write head of FIG. 2 according to one embodiment.

FIG. 3 is a MFS view of a portion of the write head 210 of FIG. 2 according to one embodiment. As shown in FIG. 3, the write head 210 includes the trailing shield 240, the main pole 220, the STO 230 disposed between the trailing shield 240 and the main pole 220, a non-magnetic conductive structure 250 surrounding a portion of the main pole 220, and a side shield 312 surrounding the non-magnetic conductive structure 250. The definition of the term "surround" includes having an intermediate material between a first element that is surrounding a second element and the second element that is being surrounded by the first element. For example, the dielectric material 254 is disposed between the non-magnetic conductive structure 250 and the side shield 312.

The main pole 220 includes a surface 320 at the MFS 212. The surface 320 includes a first side 322 in contact with the STO 230, a second side 324 connected to the first side 322, and a third side 326 opposite the second side 324.

The non-magnetic conductive structure 250 is fabricated from a non-magnetic electrically conductive metal, such as NiTa, Cr, Cu, or Rh. In some embodiments, the non-magnetic conductive structure 250 is fabricated from a multi-layer stack, such as NiTa/Ru, Cr/Cu, or Cr/Rh. The non-magnetic conductive structure 250 surrounds a portion of the main pole 220 at the MFS 212. For example, the non-magnetic conductive structure 250 surrounds the second side 324 and the third side 326 of the main pole 220. In one embodiment, the non-magnetic conductive structure 250 includes a first portion 314 and a second portion 316. The first portion 314 is in contact with the second side 324 of the main pole 220, and the second portion 316 is in contact with the third side 326 of the main pole 220. In one embodiment, the first portion 314 and the second portion 316 are fabricated from the same non-magnetic conductive material. In other embodiments, the first portion 314 and the second portion 316 are fabricated from different non-magnetic conductive materials.

The STO 230 includes an underlayer 302, an FGL 304 disposed on the underlayer 302, an interlayer 306 disposed on the FGL 304, an SPL 308 disposed on the interlayer 306, and a cap layer 310 disposed on the SPL 308. The SPL 308 may be a CoNi layer having perpendicular magnetic anisotropy. Other materials may be used as the SPL 308, such as CoPt, CoCrPt, CoPd, FePt, CoFePd, CrMo, TbFeCo, or combinations thereof. The FGL 304 may be CoFe, CoFeHo, or combinations thereof. The interlayer 306 may be a metal layer having long spin diffusion length such as Au, Ag, or Cu, when the STO 230 employs current perpendicular to plane (CPP) giant magnetoresistance (GMR). The cap layer 310 is an electrical conductive layer, such as a Ru/Ta/Ru multi-layer stack. The underlayer 302 includes the surface 321 at the MFS. The surface 321 includes a side 319 in contact with the main pole 220 and the non-magnetic conductive structure 250.

The first side 322 of the main pole 220 has a length L1 in the cross-track direction, as indicated by the X-axis. The side 319 of the surface 321 of the underlayer 302 has a length L2 in the cross-track direction, as indicated by the X-axis. The length L2 of the side 319 of the underlayer 302 is substantially greater than the length L1 of the first side 322 of the main pole 220. The FGL 304 includes a surface 303 at the MFS 212. The surface 303 has a first side 305 and a second side 307 opposite the first side 305. The first side 305 of the FGL 304 faces the main pole 220 and the non-magnetic conductive structure 250, and the second side 307 faces the SPL 308. The definition of the term "face" is extended to include a material located between a first element that is facing a second element and the second element. For example, the underlayer 302 is located between the FGL 304 and the main pole 220 (and the non-magnetic conductive structure 250). The first side 305 is in contact with the underlayer 302, and the second side 307 is in contact with the interlayer 306. The first side 305 of the FGL 304 has a length L3 in the cross-track direction, and the second side 307 of the FGL 304 has a length L4 in the cross-track direction. The length L3 of the first side 305 is substantially greater than the length L1 of the first side 322 of the main pole 220. In one embodiment, the length L3 of the first side 305 is substantially less than the length L2 of the side 319 of the underlayer 302. In another embodiment, the length L3 of the first side 305 is substantially the same as the length L2 of the side 319 of the underlayer 302. In one embodiment, the length L4 of the second side 307 is substantially the same as the length L1 of the first side 322 of the main pole 220.

The first portion 314 of the non-magnetic conductive structure 250 includes a surface 330 at the MFS 212. The second portion 316 of the non-magnetic conductive structure 250 includes a surface 332 at the MFS 212. The surface 330 of the non-magnetic conductive structure 250 includes a side 313 in contact with the STO 230. The surface 332 of the non-magnetic conductive structure 250 includes a side 315 in contact with the STO 230. The side 313 of the non-magnetic conductive structure 250 has a length L5 in the cross-track direction, as indicated by the X-axis. The side 315 of the non-magnetic conductive structure 250 has a length L6 in the cross-track direction, as indicated by the X-axis. In one embodiment, the length L5 is substantially the same as the length L6. In one embodiment, the sum of the length L5 and the length L6 is substantially greater than the length L1 of the side 322 of the main pole 220. In one embodiment, the sum of the length L5, the length L6, and the length L1 is substantially the same as the length L2 of the side 319 of the STO 230. In one embodiment, the length L3 of the side 305 of the FGL 304 is substantially less than the sum of the length L5, the length L6, and the length L1 and substantially greater than the sum of the length L1 and one of the lengths L5 and L6.

Because the non-magnetic conductive structure 250 is in contact with the main pole 220, the current flowing to the STO 230 from the main pole 220 and the non-magnetic conductive structure 250 is more uniform. The non-magnetic conductive structure 250 helps spread the electrical current to the STO 230 from the main pole 220. In one embodiment, the main pole 220 and the non-magnetic conductive structure 250 are connected to the same current source.

One or multiple current sources may be used to provide a current flowing to the STO 230 from the main pole 220 and a current flowing to the STO 230 from the non-magnetic conductive structure 250. When multiple current sources are used, the current uniformity can be further controlled by controlling the multiple current sources. The non-magnetic conductive structure 250 provides additional paths for electrical currents to flow to the STO 230. The non-magnetic conductive structure 250 enables higher current density to the STO 230 without creating hot spots at the MFS 212. Maximum current efficiency and uniformity can be achieved with the non-magnetic conductive structure 250.

Figure 4A:
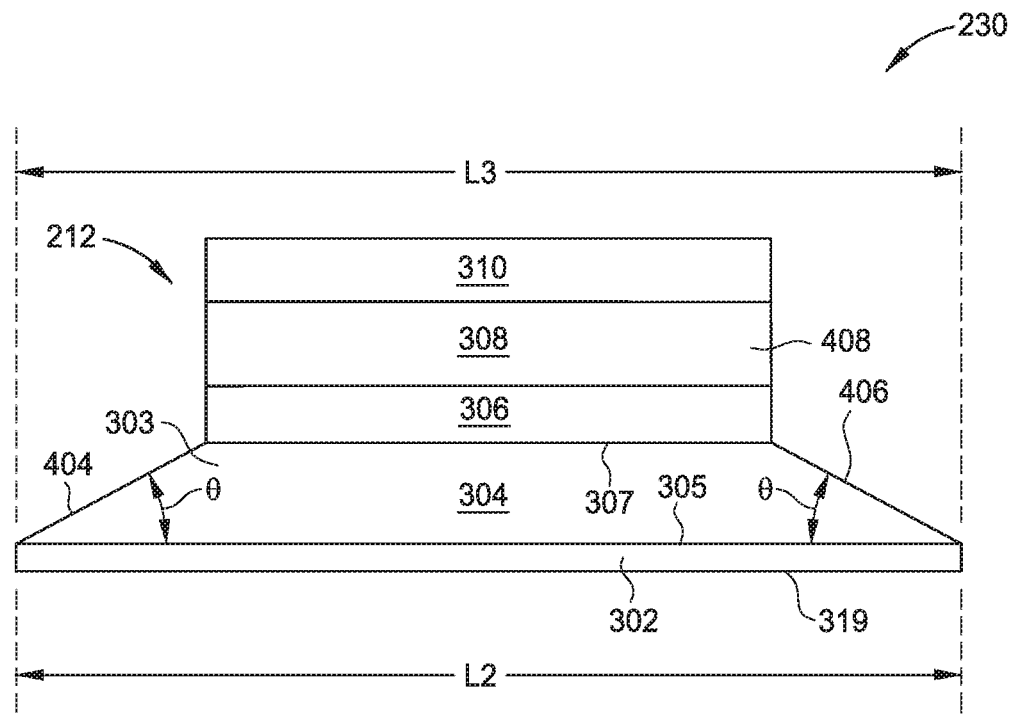
FIGS. 4A-4C are MFS views of an STO of the write head of FIG. 2 according to one embodiment.
Figure 4B:
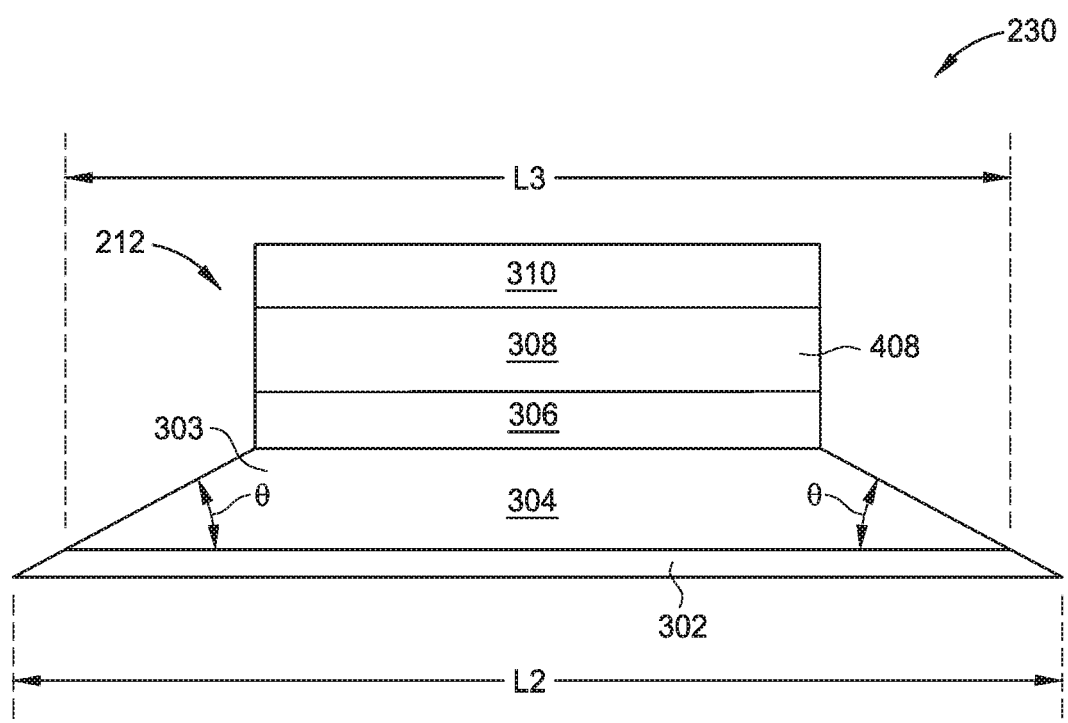
Figure 4C:
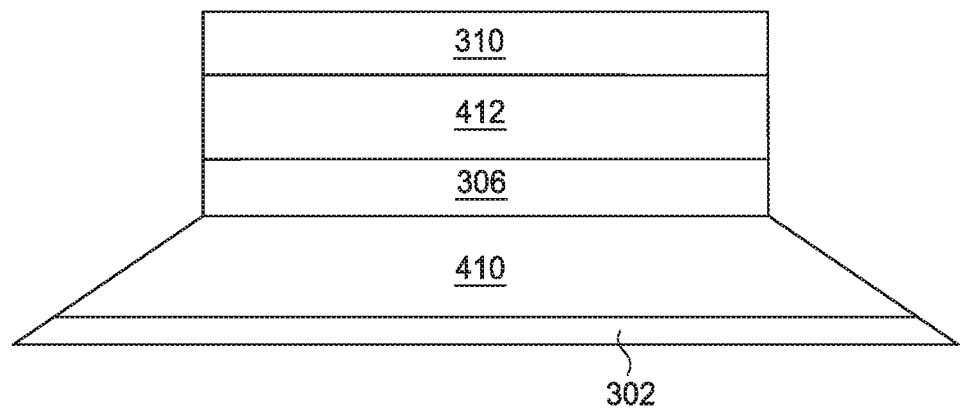

FIGS. 4A-4C are MFS views of the STO 230 of the write head 210 of FIG. 2 according to one embodiment. The STO 230 includes the underlayer 302, the FGL 304, the interlayer 306, the SPL 308, and the cap layer 310. As shown in FIG. 4A, the length L2 of the side 319 of the underlayer 302 is substantially the same as the length L3 of the side 305 of the FGL 304. The FGL 304 includes the surface 303 at the MFS 212. The surface 303 includes the first side 305, the second side 307, a third side 404 connecting the first side 305 and the second side 307, and a fourth side 406 opposite the third side 404. The surface 303 has a trapezoidal shape, as shown in FIG. 4A, and the trapezoidal shaped surface 303 includes two acute angles θ. The acute angles θ may be greater than about 38 degrees, such as between about 38 degrees and about 85 degrees. The angles θ is formed between the side 305 and the side 404 or 406. The angle formed between the side 305 and the side 404 may not be the same as the angle formed between the side 305 and the side 406. The SPL 308 includes a surface 408 at the MFS 212. The surface 408 of the SPL 308 has a rectangular shape.

As shown in FIG. 4B, the length L2 of the side 319 of the underlayer 302 is substantially greater than the length L3 of the side 305 of the FGL 304. The FGL 304 includes the trapezoidal shaped surface 303 having two acute angles θ at the MFS 212. The SPL 308 includes the rectangular shaped surface 408 at the MFS 212.

As shown in FIG. 4C, the STO 230 includes the underlayer 302, a first magnetic layer 410 disposed on the underlayer 302, the interlayer 306 disposed on the first magnetic layer 410, a second magnetic layer 412 disposed on the interlayer 306, and the cap layer 310 disposed on the second magnetic layer 412. In one embodiment, the first magnetic layer 410 is the FGL having the trapezoidal shaped surface at the MFS 212, and the second magnetic layer 412 is the SPL having the rectangular shaped surface at the MFS 212. The FGL is located proximate to the main pole 220 (FIG. 3), and the SPL is located proximate to the trailing shield 240 (FIG. 3). In another embodiment, the first magnetic layer 410 is the SPL having the trapezoidal shaped surface at the MFS 212, and the second magnetic layer 412 is the FGL having the rectangular shaped surface at the MFS 212. The SPL is located proximate to the main pole 220 (FIG. 3), and the FGL is located proximate to the trailing shield 240 (FIG. 3). In another embodiment, both the first and second magnetic layers 410, 412 have rectangular shaped surfaces at the MFS 212.

Figure 6A:
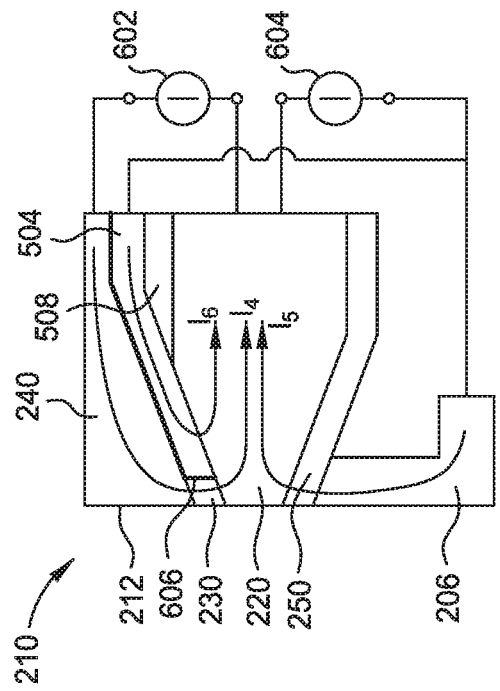
FIGS. 6A-6C are cross-sectional side views of the write head of FIG. 2 according to another embodiment.
Figure 6B:
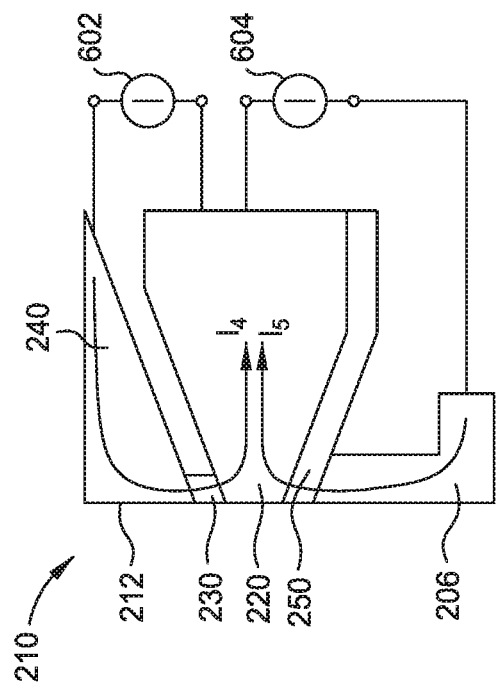
Figure 6C:
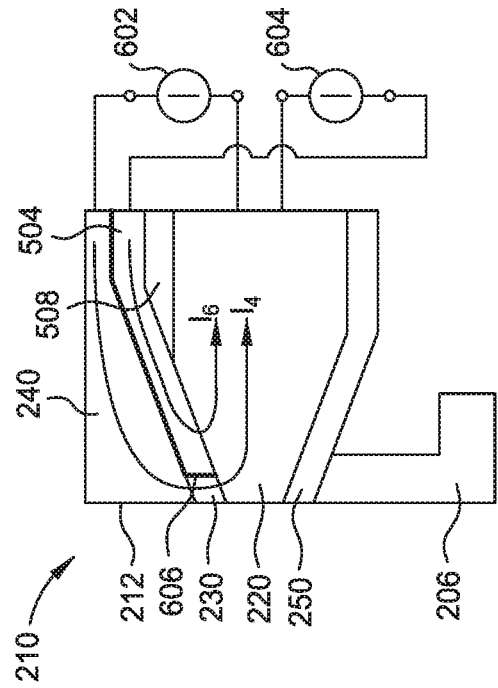

With various configurations of the STO 230, different types of oscillation by the STO 230 can be achieved. FIGS. 5A-5D illustrate various ways one or more electrical currents can flow through the STO 230 using one current source. FIGS. 6A-6C illustrate various ways one or more electrical currents can flow through the STO 230 using two current sources.

FIGS. 5A-5D are cross-sectional side views of the write head 210 of FIG. 2 according to one embodiment. The dielectric material 254 is omitted in FIGS. 5A-5D for better illustration. As shown in FIG. 5A, the write head 210 includes a current source 502 connected to the main pole 220 and the trailing shield 240. A current $I_1$ generated from the current source 502 flows from the main pole 220 to the trailing shield 240 through the STO 230. In one embodiment, the current $I_1$ flows from the trailing shield 240 to the main pole 220 through the STO 230.

As shown in FIG. 5B, the current source 502 is connected to the main pole 220, the trailing shield 240, and the leading shield 206. In addition to the current $I_1$, a second current $I_2$ flows from the main pole 220 to the leading shield 206 through the non-magnetic conductive structure 250. As current flows through the non-magnetic conductive structure 250, write-ability of the write head 210 is improved. In one embodiment, the FGL of the STO 230 is located proximate to the main pole 220, and the current $I_1$ flows from the main pole 220 to the trailing shield 240 through the STO 230, as shown in FIG. 5B. In another embodiment, the FGL of the STO 230 is located proximate to the trailing shield 240, and the current $I_1$ flows from the trailing shield 240 to the main pole 220 through the STO 230. In one embodiment, the STO 230 is not present, and write-ability is improved by flowing the current $I_2$ through the non-magnetic conductive structure 250.

As shown in FIG. 5C, a non-magnetic conductive layer 504 is disposed between the main pole 220 and the trailing shield 240 at a location recessed from the MFS 212. The non-magnetic conductive layer 504 may be fabricated from the same material as the non-magnetic conductive structure 250. A dielectric layer 506 is disposed between the STO 230 and the non-magnetic conductive layer 504. The dielectric layer 506 may be fabricated from the same material as the dielectric material 254. A dielectric layer 508 is disposed between a portion of the non-magnetic conductive layer 504 and a portion of the main pole 220. The dielectric layer 508 may be fabricated from the same material as the dielectric material 254. The current source 502 is connected to the main pole 220 and the trailing shield 240. In addition to the current $I_1$, a second current $I_3$ flows from the main pole 220 to the trailing shield 240 through the non-magnetic conductive layer 504. As current flows through the non-magnetic conductive layer 504, write-ability of the write head 210 is improved. In one embodiment, the FGL of the STO 230 is located proximate to the main pole 220, the current $I_1$ flows from the main pole 220 to the trailing shield 240 through the STO 230, and the current $I_3$ flows from the main pole 220 to the trailing shield 240 through the non-magnetic conductive layer 504, as shown in FIG. 5C. In another embodiment, the FGL of the STO 230 is located proximate to the trailing shield 240, the current $I_1$ flows from the trailing shield 240 to the main pole 220 through the STO 230, and the current $I_3$ flows from the trailing shield 240 to the main pole 220 through the non-magnetic conductive layer 504. In one embodiment, the STO 230 and the dielectric layer 506 are not present, and the non-magnetic conductive layer 504 extends to the MFS 212.

As shown in FIG. 5D, the current source 502 is connected to the main pole 220, the trailing shield 240, and the leading shield 206. Current $I_1$ flows from the main pole 220 to the trailing shield 240 through the STO 230, current $I_2$ flows from the main pole 220 to the leading shield 206 through the non-magnetic conductive structure 250, and current $I_3$ flows from the main pole 220 to the leading shield 206 through the non-magnetic conductive layer 504. In one embodiment, the FGL of the STO 230 is located proximate to the main pole 220, the current $I_1$ flows from the main pole 220 to the trailing shield 240 through the STO 230, and the current $I_3$ flows from the main pole 220 to the trailing shield 240 through the non-magnetic conductive layer 504, as shown in FIG. 5D. In another embodiment, the FGL of the STO 230 is located proximate to the trailing shield 240, the current $I_1$ flows from the trailing shield 240 to the main pole 220 through the STO 230, and the current $I_3$ flows from the trailing shield 240 to the main pole 220 through the non-magnetic conductive layer 504. In one embodiment, the STO 230 and the dielectric layer 506 are not present, and the non-magnetic conductive layer 504 extends to the MFS 212. The operations of the current source 502 are controlled by the control unit 129 (FIG. 1)

FIGS. 6A-6C are cross-sectional side views of the write head 210 of FIG. 2 according to one embodiment. The dielectric material 254 is omitted in FIGS. 6A-6C for better illustration. As shown in FIG. 6A, the write head 210 includes a first current source 602 connected to the main pole 220 and the trailing shield 240 and a second current source 604 connected to the main pole 220 and the leading shield 206. A current $I_4$ generated from the current source 602 flows from the trailing shield 240 to the main pole 220 through the STO 230. A current $I_5$ generated from the current source 604 flows from the leading shield 206 to the main pole 220 through the non-magnetic conductive structure 250. In one embodiment, the current $I_4$ flows from the main pole 220 to the trailing shield 240, and the current $I_5$ flows from the main pole 220 to the leading shield 206.

As shown in FIG. 6B, the current source 602 is connected to the main pole 220 and the trailing shield 240. The current source 604 is connected to the main pole 220, the leading shield 206, and the non-magnetic conductive layer 504. A dielectric layer 606 is disposed between the STO 230 and the non-magnetic conductive layer 504, and between the trailing shield 240 and the non-magnetic conductive layer 504. In addition to currents $I_4$ and $I_5$, a current $I_6$ flows from the non-magnetic conductive layer 504 to the main pole 220. In one embodiment, the current $I_4$ flows from the main pole 220 to the trailing shield 240, the current $I_5$ flows from the main pole 220 to the leading shield 206, and the current $I_6$ flows from the main pole 220 to the non-magnetic conductive layer 504. In one embodiment, the STO 230 and the dielectric layer 606 are not present, and the non-magnetic conductive layer 504 extends to the MFS 212.

As shown in FIG. 6C, the current source 602 is connected to the main pole 220 and the trailing shield 240. The current source 604 is connected to the main pole 220 and the non-magnetic conductive layer 504. Current $I_4$ flows from the trailing shield 240 to the main pole 220 through the STO 230. Current $I_6$ flows from the non-magnetic conductive layer 504 to the main pole 220. In one embodiment, the current $I_4$ flows from the main pole 220 to the trailing shield 240, and the current $I_6$ flows from the main pole 220 to the non-magnetic conductive layer 504. In one embodiment, the STO 230 and the dielectric layer 606 are not present, and the non-magnetic conductive layer 504 extends to the MFS 212. The operations of the current sources 602, 604 are controlled by the control unit 129 (FIG. 1)

In summary, a MAMR enabled magnetic head is disclosed. The MAMR head includes an STO in contact with a main pole and a non-magnetic conductive structure surrounding the main pole. The STO includes an FGL proximate to the main pole, and the FGL has a trapezoidal shape at the MFS. The non-magnetic conductive structure and the trapezoidal shaped FGL provide additional paths for electrical currents to flow to the STO from the main pole and the non-magnetic conductive structure. The non-magnetic conductive structure and the trapezoidal shaped FGL enable higher current density to the STO without creating hot spots at the MFS. Maximum current efficiency and uniformity can be achieved with the non-magnetic conductive structure and the trapezoidal shaped FGL.

In one non-limiting embodiment, a magnetic recording head includes a main pole, and a spin torque oscillator in contact with the main pole. The spin torque oscillator includes a spin polarization layer and a field generation layer disposed between the spin polarization layer and the main pole. The field generation layer includes a surface at a media facing surface, and the surface has a trapezoidal shape. The magnetic recording head further includes a non-magnetic conductive structure surrounding at least a portion of the main pole, and the non-magnetic conductive structure is in contact with the spin torque oscillator.

In another non-limiting embodiment, the magnetic recording head further includes an underlayer in contact with the main pole and the non-magnetic conductive structure, and the field generation layer is disposed on the underlayer. The magnetic recording head further includes an interlayer disposed between the spin polarization layer and the field generation layer and a cap layer disposed on the spin polarization layer.

In another non-limiting embodiment, the non-magnetic conductive structure includes a non-magnetic electrically conductive metal.

In another non-limiting embodiment, the non-magnetic conductive structure further includes NiTa, Cr, Cu, or Rh.

In another non-limiting embodiment, the spin polarization layer includes a surface at the media facing surface, and the surface has a rectangular shape.

In another non-limiting embodiment, a data storage device includes the magnetic recording head.

In another non-limiting embodiment, a magnetic recording head includes a main pole, and a spin torque oscillator in contact with the main pole. The spin torque oscillator includes a spin polarization layer and a field generation layer disposed between the spin polarization layer and the main pole. The field generation layer includes a surface at a media facing surface, and the surface includes a first side facing the main pole and a second side facing the spin polarization layer. The first side has a length that is substantially greater than a length of the second side. The magnetic recording head further includes a non-magnetic conductive structure surrounding at least a portion of the main pole, and the first side of the field generation layer is disposed over at least a portion of the non-magnetic conductive structure.

In another non-limiting embodiment, the spin torque oscillator further includes an underlayer in contact with the main pole and the non-magnetic conductive structure, and the field generation layer is disposed on the underlayer.

In another non-limiting embodiment, the underlayer includes a surface at the media facing surface, wherein the surface includes a side in contact with the main pole and the non-magnetic conductive structure.

In another non-limiting embodiment, the side of the underlayer has a length substantially greater than the length of the first side of the field generation layer.

In another non-limiting embodiment, the side of the underlayer has a length substantially the same as the length of the first side of the field generation layer.

In another non-limiting embodiment, a magnetic recording head includes a main pole, and a spin torque oscillator in contact with the main pole. The spin torque oscillator includes a spin polarization layer and a field generation layer disposed between the spin polarization layer and the main pole. The field generation layer includes a surface at a media facing surface, and the surface includes a first side facing the main pole, a second side facing the spin polarization layer, a third side connecting the first side and the second side, and a fourth side opposite the third side. The first side forms a first acute angle with the third side. The magnetic recording head further includes a non-magnetic conductive structure surrounding at least a portion of the main pole, and the non-magnetic conductive structure is in contact with the spin torque oscillator.

In another non-limiting embodiment, the first acute angle ranges from about 38 degrees to about 85 degrees.

In another non-limiting embodiment, the first side of the surface of the field generation layer forms a second acute angle with the fourth side.

In another non-limiting embodiment, the second acute angle ranges from about 38 degrees to about 85 degrees.

In another non-limiting embodiment, the first acute angle and the second acute angle are different.

In another non-limiting embodiment, a magnetic recording head includes a leading shield, a trailing shield, a main pole having a surface at a media facing surface, wherein the surface includes a side, a spin torque oscillator in contact with the side of the main pole, wherein the spin torque oscillator comprises a spin polarization layer and a field generation layer, a non-magnetic conductive structure surrounding at least a portion of the main pole, a first current source connected to the main pole and the trailing shield, and a second current source connected to the main pole and the leading shield.

In another non-limiting embodiment, the first current source is configured to flow a first current from the main pole to the trailing shield through the spin torque oscillator, and the second current source is configured to flow a second current from the main pole to the leading shield through the non-magnetic conductive structure.

In another non-limiting embodiment, the first current source is configured to flow a first current from the trailing shield to the main pole through the spin torque oscillator, and the second current source is configured to flow a second current from the leading shield to the main pole through the non-magnetic conductive structure.

In another non-limiting embodiment, the magnetic recording head further includes a non-magnetic conductive layer disposed between the trailing shield and the main pole.

In another non-limiting embodiment, the magnetic recording head further includes a dielectric layer disposed between the spin torque oscillator and the non-magnetic conductive layer and between the trailing shield and the non-magnetic conductive layer.

In another non-limiting embodiment, the second current source is connected to non-magnetic conductive layer.

In another non-limiting embodiment, the second current source is configured to flow a third current from the non-magnetic conductive layer to the main pole.

In another non-limiting embodiment, a magnetic recording head includes a leading shield, a trailing shield, a main pole having a surface at a media facing surface, wherein the surface includes a side, a non-magnetic conductive layer disposed between the trailing shield and the main pole, a spin torque oscillator in contact with the side of the main pole, wherein the spin torque oscillator comprises a spin polarization layer and a field generation layer, a non-magnetic conductive structure surrounding at least a portion of the main pole, and a current source configured to flow a first current from the main pole to the trailing shield through the spin torque oscillator and a second current from the main pole to the trailing shield through the non-magnetic conductive layer.

In another non-limiting embodiment, the current source is connected to the main pole and the trailing shield.

In another non-limiting embodiment, the current source is connected to the leading shield and is configured to flow a third current from the main pole to the leading shield through the non-magnetic conductive structure.

While the foregoing is directed to embodiments of the present disclosure, other and further embodiments of the disclosure may be devised without departing from the basic scope thereof, and the scope thereof is determined by the claims that follow.

What is claimed is:
1. A magnetic recording head, comprising:
a main pole;

a spin torque oscillator in contact with the main pole, wherein the spin torque oscillator comprises a spin polarization layer and a field generation layer disposed between the spin polarization layer and the main pole, wherein the field generation layer includes a surface at a media facing surface, and the surface has a trapezoidal shape, wherein the trapezoidal shape has a first side facing the main pole and a second side facing the spin polarization layer, wherein the first side has a length in a cross-track direction that is greater than a length in the cross-track direction of the second side; and a non-magnetic conductive structure surrounding at least a portion of the main pole, wherein the non-magnetic conductive structure is in contact with the spin torque oscillator.

2. The magnetic recording head of claim 1, wherein the non-magnetic conductive structure comprises a non-magnetic electrically conductive metal.

3. The magnetic recording head of claim 2, wherein the non-magnetic conductive structure further comprises NiTa, Cr, Cu, or Rh.

4. The magnetic recording head of claim 1, wherein the spin polarization layer includes a surface at the media facing surface, wherein the surface has a rectangular shape.

5. A data storage device comprising the magnetic recording head of claim 1.

6. A magnetic recording head, comprising:

a main pole;

a spin torque oscillator in contact with the main pole, wherein the spin torque oscillator comprises a spin polarization layer and a field generation layer disposed between the spin polarization layer and the main pole, wherein the field generation layer includes a surface at a media facing surface, and the surface has a trapezoidal shape;

a non-magnetic conductive structure surrounding at least a portion of the main pole, wherein the non-magnetic conductive structure is in contact with the spin torque oscillator an underlayer in contact with the main pole and the non-magnetic conductive structure, wherein the field generation layer is disposed on the underlayer;

an interlayer disposed between the spin polarization layer and the field generation layer; and a cap layer disposed on the spin polarization layer.

7. A magnetic recording head, comprising:

a main pole;

a spin torque oscillator in contact with the main pole, wherein the spin torque oscillator comprises a spin polarization layer and a field generation layer disposed between the spin polarization layer and the main pole, wherein the field generation layer includes a surface at a media facing surface, and the surface includes a first side facing the main pole and a second side facing the spin polarization layer, wherein the first side has a length that is substantially greater than a length of the second side; and a non-magnetic conductive structure surrounding at least a portion of the main pole, wherein the first side of the field generation layer is disposed over at least a portion of the non-magnetic conductive structure.

8. The magnetic recording head of claim 7, wherein the spin torque oscillator further comprises an underlayer in contact with the main pole and the non-magnetic conductive structure, wherein the field generation layer is disposed on the underlayer.

9. The magnetic recording head of claim 8, wherein the underlayer includes a surface at the media facing surface, wherein the surface includes a side in contact with the main pole and the non-magnetic conductive structure.

10. The magnetic recording head of claim 9, wherein the side of the underlayer has a length substantially greater than the length of the first side of the field generation layer.

11. The magnetic recording head of claim 9, wherein the side of the underlayer has a length substantially the same as the length of the first side of the field generation layer.

12. A data storage device comprising the magnetic recording head of claim 7.

* * * * *